US008141579B2

(12) United States Patent
Costaz et al.

(10) Patent No.: US 8,141,579 B2
(45) Date of Patent: Mar. 27, 2012

(54) VALVE WITH CUSHIONED OPENING SYSTEM

(75) Inventors: Dominique Costaz, Nogent sur Oise (FR); Alain Mangano, Vieux Moulin (FR)

(73) Assignee: Poclain Hydraulics Industrie, Verberie (FR)

( * ) Notice: Subject to any disclaimer, the term of this patent is extended or adjusted under 35 U.S.C. 154(b) by 1015 days.

(21) Appl. No.: 12/090,388

(22) PCT Filed: Oct. 20, 2006

(86) PCT No.: PCT/FR2006/051072
§ 371 (c)(1),
(2), (4) Date: Apr. 16, 2008

(87) PCT Pub. No.: WO2007/045803
PCT Pub. Date: Apr. 26, 2007

(65) Prior Publication Data
US 2008/0230729 A1    Sep. 25, 2008

(30) Foreign Application Priority Data
Oct. 20, 2005  (FR) .................................... 05 10701

(51) Int. Cl.
*F16K 31/12* (2006.01)

(52) U.S. Cl. .......... 137/494; 137/508; 137/509; 251/50

(58) Field of Classification Search .................. 137/494, 137/495, 508, 509; 251/21, 50
See application file for complete search history.

(56) References Cited

U.S. PATENT DOCUMENTS

| 3,744,515 | A | * | 7/1973 | Inoue | 137/494 |
| 4,275,758 | A | * | 6/1981 | Masuda | 137/489 |
| 5,522,422 | A | * | 6/1996 | Beck | 303/9.62 |

FOREIGN PATENT DOCUMENTS

| DE | 40 33 301 | 4/1992 |
| DE | 42 21 213 | 1/1994 |
| EP | 0 638 746 | 2/1995 |
| EP | 0 816 729 | 1/1998 |
| WO | 03/056220 | 7/2003 |

OTHER PUBLICATIONS
International Search Report ; PCT/FR2006/051072.

* cited by examiner

*Primary Examiner* — John Fristoe, Jr.
*Assistant Examiner* — R. K. Arundale
(74) *Attorney, Agent, or Firm* — Ladas & Parry LLP

(57) ABSTRACT

A valve including a valve body having an inlet port and an outlet port, a valve stem, a valve seat, an opening control chamber for the valve stem, which chamber, by being fed with fluid, urges the valve stem to move towards the open position of the valve, a return spring of opposing effect, and a piston suitable for sliding in the body so as to urge contact to be established between the valve stem and the seat. The valve seat is formed on the piston, which piston is provided with a bore in which the valve stem is in its closure movement, the fluid flows out via a constriction from a damping chamber.

18 Claims, 4 Drawing Sheets

VALVE WITH CUSHIONED OPENING SYSTEM

BACKGROUND OF THE INVENTION

The present invention relates to a valve having damped opening, said valve comprising a valve body having an inlet port and an outlet port, a valve stem suitable for moving between a closed position in which said stem co-operates with a valve seat so as to isolate the inlet port and the outlet port from each other, and an open position in which the stem is spaced apart from the seat so as to put the inlet and the outlet ports into communication with each other, the valve further comprising an opening control chamber for the valve stem, which chamber is suitable for being fed with fluid so as to urge the valve stem to move towards its open position, a return spring for urging the valve stem to move towards its closed position, a piston suitable for sliding in the body in a closure movement for urging contact to be established between the valve stem and the seat, and hydraulic control means for causing the piston to move, which control means include a flow-rate limiter device for deferring the closure movement of the piston relative to the movement of the valve stem towards its open position.

The invention is particularly applicable to a valve used as a pressure limiter, i.e. a valve that, when the pressure at the inlet port reaches a determined limit pressure, opens so as to connect the inlet port to the outlet port, thereby limiting the pressure in the duct connected to the inlet port. In particular, such a pressure limiter is used in a hydraulic feed circuit of a hydraulic motor, by being connected to the feed and discharge main ducts of the motor in order to limit pressure in those ducts.

More precisely, the valve of the invention is, in particular, a pressure limiter valve that is used in the hydraulic feed circuit of a hydraulic motor that is designed to drive a mass presenting high inertia. In which case, there exists a higher risk of pressure increasing suddenly in the feed main duct while the motor is being switched on, and of pressure increasing suddenly in the discharge duct while the motor is being braked. Such increases in pressure are due to the inertia of the mass that is driven.

Conventional pressure limiter valves suffer from the drawback of giving rise to large jolts, due to the sudden increases in pressure. The response time of a valve is, in general, such that it opens only once the pressure threshold at the inlet port of the valve has already been exceeded. The valve opening then causes the pressure at the inlet port to fall suddenly to bring it to the limitation target pressure, and thus gives rises to an unpleasant jolt.

In order to remedy those drawbacks of conventional valves, DE 40 33 301 discloses a pressure limiter valve having damped opening of the above-mentioned type. That valve opens as from a first intermediate threshold that is lower than the nominal setting corresponding to the target pressure limitation, and then makes it possible for the pressure at the inlet port to increase gradually to the nominal pressure setting. More precisely, in that known valve, the valve stem can be spaced apart from its stationary seat in order to open the valve as soon as the pressure at the inlet port reaches an intermediate value corresponding to the initial setting of the return spring of that valve stem. The piston is disposed around the valve stem and is in abutment against the rear end of the spring, so that that piston, when it is moved, increases the return forces exerted by the spring on the valve stem, so as to urge said valve stem to return against its seat. The piston is caused to move by feeding fluid to a control chamber that is situated behind the spring and that is connected to the inlet port via the center of the valve stem, via a constriction. Moving the piston in the direction in which the spring is compressed is possible only subject to a damping chamber being emptied, that emptying being slow insofar as it takes place via constricted passages. That feature makes it possible to delay movement of the piston so that said piston moves after the valve has been opened due to the valve stem moving.

When the pressure increases at the inlet port, above the pressure setting of the spring, a plurality of cycles take place, during which the valve stem is alternately spaced apart from its seat by being moved in a first direction under the effect of the pressure and returned in the opposite direction so as to come back into abutment with its seat, under the effect of the combined return force from the piston and from the spring. Those cycles take place in succession until the piston comes into abutment against a step in the valve body, in which position the compression of the spring corresponds to the nominal setting of the pressure limiter valve, so that the valve normally remains open so long as the pressure at its inlet port is at least equal to said nominal pressure setting.

The valve of DE 40 33 301 suffers from the drawback of having a complex structure, in particular since, in order to cause the piston to move, which piston itself causes the return spring of the valve stem to be further compressed, it is necessary to form a plurality of passages of precise dimensions in the valve body, for feeding the control chamber and for emptying the damping chamber. Those passages are significantly long because the control and damping chambers of the piston are situated behind the spring, in positions remote from the inlet port, from which those chambers are fed.

EP 0 638 746 discloses a valve of the above-mentioned type, in which, in addition, the valve seat is formed on the piston, said piston being provided with a bore in which the valve stem is slidably disposed.

In EP 0 638 746, the fluid feed to the closure control chamber for causing the piston to move in the closure movement is limited by a constriction. That does indeed make it possible to defer the closure movement of the piston, but, insofar as that constriction also limits fluid flow out of that chamber, and insofar as such outflow is necessary for resetting the valve, that constriction slows down the resetting, so that the valve is not operational rapidly.

An object of the present invention is to improve that state of the art by proposing a valve having damped opening that is suitable, in particular, for being used as a pressure limiter, that has a structure that is simpler and more compact, and that is quicker to reset.

In the meaning of the present invention, the fact that opening is damped means that, before the valve opens fully, said valve is opened partially in a manner such as to control, over time, the head loss between the inlet and the outlet ports, without causing said head loss to decrease suddenly. In other words, the decrease in head loss is damped.

This object is achieved by the fact that the hydraulic control means for causing the piston to move include a damping chamber disposed in a manner such that fluid must flow out of said damping chamber in order to enable the piston to move in its closure movement, the fluid flowing out via the flow-rate limiter device that is disposed between the damping chamber and the outlet port.

In accordance with the invention, the valve seat is mounted to move. Thus, when the pressure in the opening control chamber for the valve stem reaches the setting of the return spring of said stem, said stem is, in a first stage, spaced apart from its seat so as to enable the valve to open. However, the hydraulic control means of the piston enable said piston to move in a manner such that the seat "catches up" the valve stem so as to close the valve again. If the pressure continues to increase in the opening control chamber for the valve stem, then said valve stem is spaced apart from its seat again, and then said seat "catches up" the valve stem again.

The invention thus re-uses the principle of the valve opening and closing in cycles until it is maximally open, so as to make opening gradual. However, unlike in DE 40 33 301, the seat of the valve stem is a moving part, and it is said seat that moves to catch up the valve stem and to close the valve again at the end of each cycle. Thus, the valve stem is not, in itself, caused to move in reciprocating motion so as alternately to open and to close the valve during each cycle, but rather it always moves in the same direction, and it is caught up by the seat which also moves in the same direction. Operation is thus simpler than in DE 40 33 301, thereby making it possible to limit the durations of the opening and closure cycles since it is not necessary, within each cycle, to reverse the movement of the valve stem. Thus, the damping is made more gradual than in DE 40 33 301. In addition, the piston in which the seat is formed for the valve stem does not act directly on the setting spring. Its hydraulic control means can also be extremely simple, and situated in the vicinity of the inlet port, without any complex machining being necessary.

In accordance with the invention, the closure movement of the piston is damped without detrimentally affecting resetting of the valve. After an operating cycle, the piston can return very rapidly to its rest position, unlike in EP 0 638 746 in which the return to such a position requires the fluid contained in the piston closure control chamber to flow out via a constriction.

In particular, the flow-rate limiter device serves to limit the flow of fluid in the direction in which said chamber is emptied, which emptying is necessary to the closure movement of the piston.

The flow-rate limiter device can be of any known type, and, in particular, a constriction, a nozzle, or a flow-rate regulator.

Advantageously, the opening control chamber for the valve seat is provided in the piston, and the hydraulic control means for causing the piston to move include a closure control chamber for the piston, which chamber communicates with said opening control chamber for the valve stem via the inside of the valve.

By means of these provisions, it is the same fluid source that feeds both the opening control chamber for the valve stem and also the closure control chamber for the piston. The feed cross-sections for those chambers, and the respective thrust cross-sections for fluid thrust against the valve stem and against the piston can be such that the valve stem moves more rapidly than said piston, in order to open the valve before the piston has been able to catch up said stem so as to close said valve again.

Advantageously, the opening control chamber for the valve stem communicates with the inlet port.

In which case, the valve having damped opening is, in particular, used as a pressure limiter.

Advantageously, the piston has at least one window disposed between the bore and a peripheral portion of the piston that is situated in a space communicating with the inlet port, and the valve stem has an axial bearing surface that is suitable for co-operating with a guide portion of the bore that is situated between the opening control chamber for the valve stem and said window, clearance provided between said axial bearing surface and said guide portion making it possible for communication to be established between said space and the opening control chamber for the valve stem.

Said space may be constituted by the closure control chamber for the piston. In a variant, the bore of the piston is stepped and has a smaller-diameter portion, defined by the valve stem and in which the opening control chamber for said stem is formed, and a larger-diameter portion remote from the valve stem and in which said closure control chamber for the piston is formed.

BRIEF DESCRIPTION OF THE DRAWING FIGURES

The invention can be well understood and its advantages appear more clearly on reading the following detailed description of an embodiment shown by way of non-limiting example in the accompanying drawings, in which.

DETAILED DESCRIPTION OF THE PREFERRED EMBODIMENTS

Figure 1:
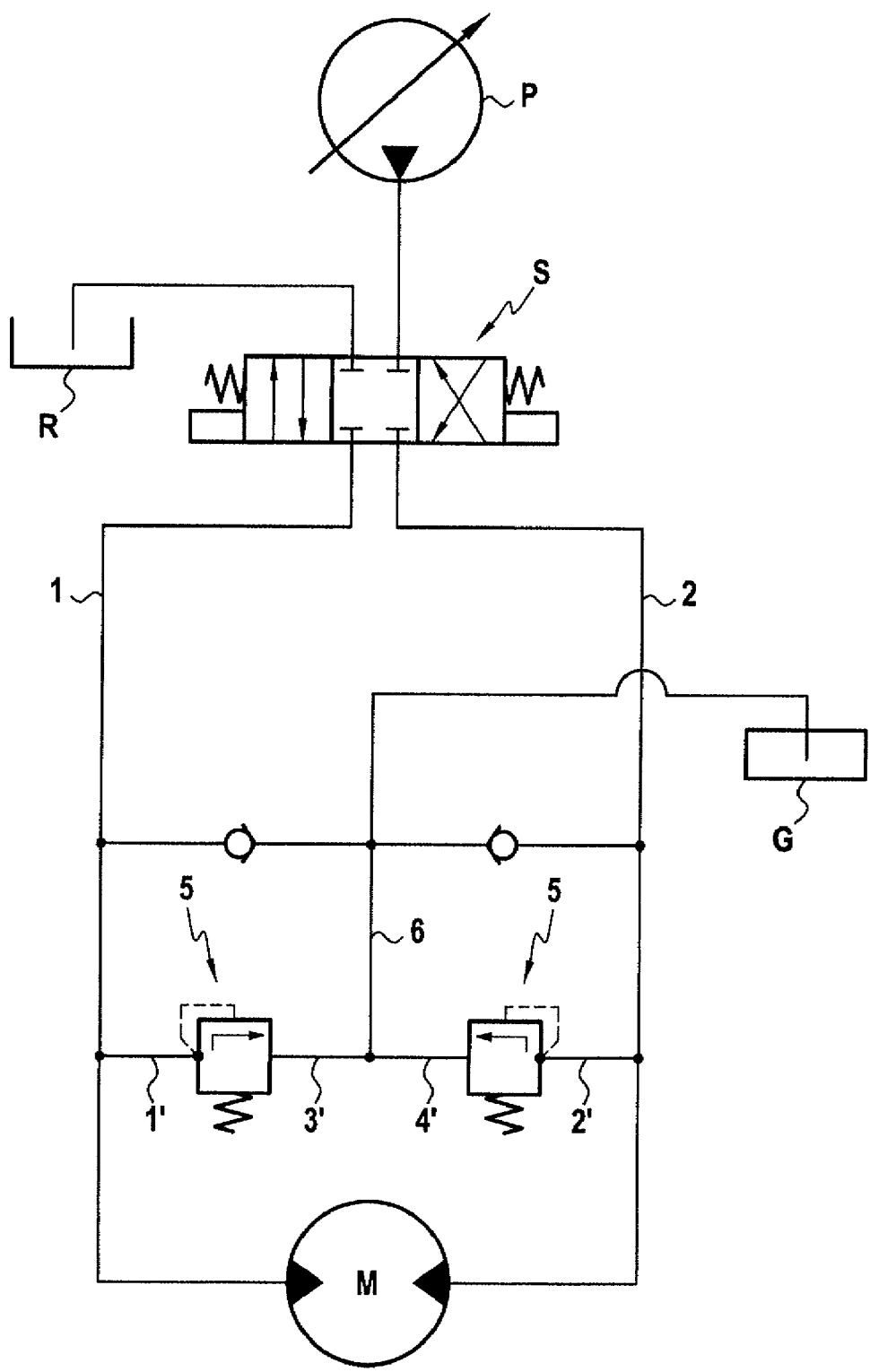
FIG. 1 is a view of a circuit suitable for using two valves of the invention as pressure limiters.

The circuit shown in FIG. 1 comprises a pump P for feeding fluid to a hydraulic motor M via two main ducts 1, 2 that serve respectively for feed and for discharge as a function of the position of a selector S. Although an open circuit is shown (the discharge duct being connected to a reservoir R at atmospheric pressure or at a very low pressure), it also possible to imagine the circuit being a closed circuit. Two conventional pressure limiters 5 serve to limit the pressure in the feed main duct. Their respective inlet valves 1', and 2' are connected to respective ones of the ducts 1 and 2, while their respective outlet ports 3' and 4' are connected to booster means G via a duct 6.

In a conventional variant, the pressure limiters 5 can have their respective inlet ports connected to respective ones of the ducts 1 and 2, while their respective outlet ports are connected to respective ones of the ducts 2 and 1.

These are conventional circuits in which two valves of the invention can advantageously replace the pressure limiters 5.

The valve of the invention can also be used as a pressure limiter for a circuit of the type described in French Patent Application No. 04 07910 (not published at the priority date of the present application), by being connected to a selector that, depending on its position, makes it possible to connect the inlet of the valve to that one of the main ducts of the circuit that is at the higher pressure.

Figure 2:
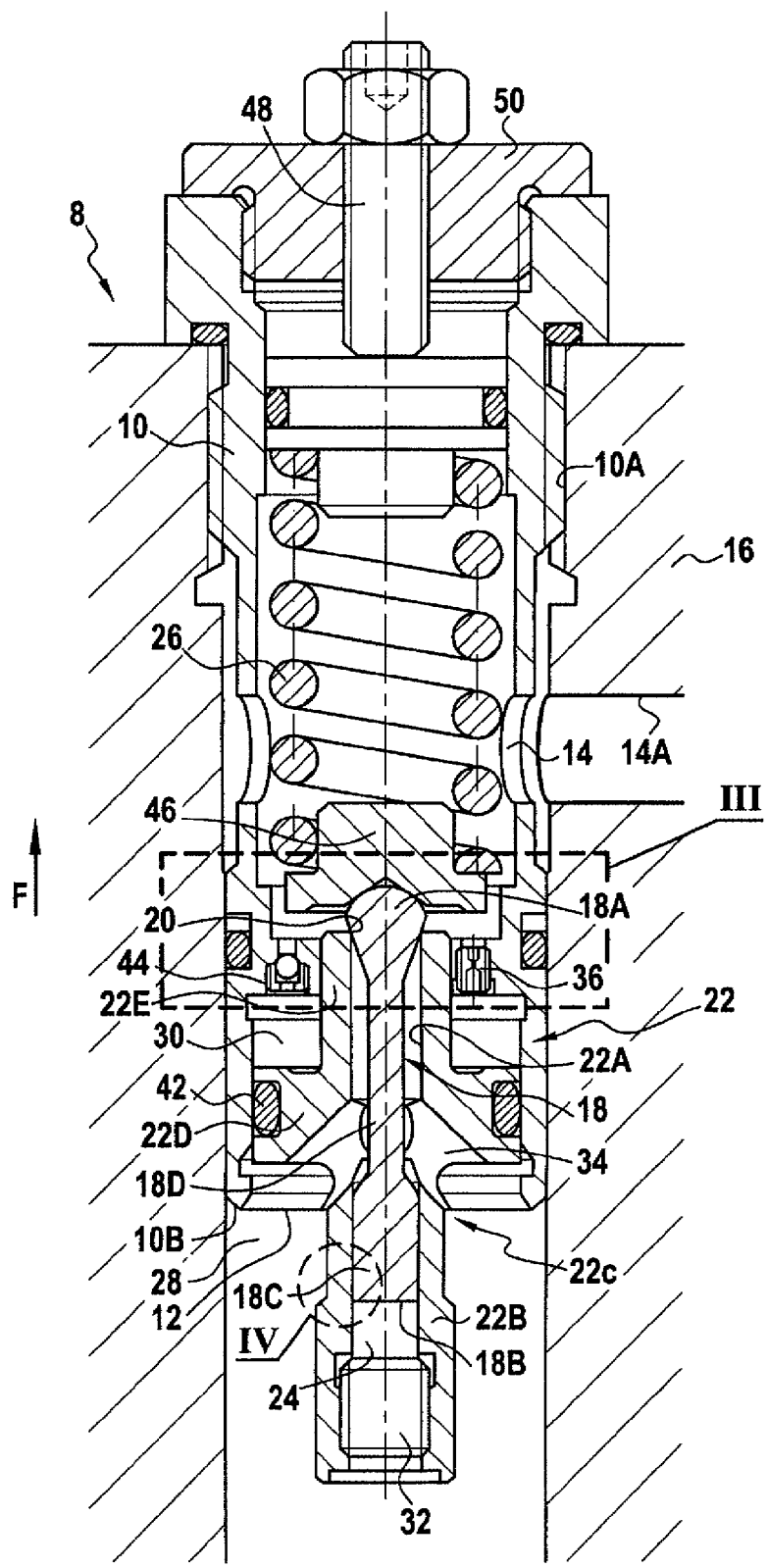
FIG. 2 is an axial section view of a valve of the invention.

The valve 8 shown in FIG. 2 includes a valve body 10 having an inlet port 12 and an outlet port 14.

In this example, the valve body can be fastened, e.g. by screw-fastening by means of it having a threaded cylindrical bearing surface 10A, into an element 16 such as a portion of the casing of a hydraulic motor. In this example, the inlet port 12 is formed at that end 10B of the valve body that is situated inside said element 16, while the outlet port 14 communicates with a hole 14A in the element 16.

The valve has a valve stem 18 that is mounted to move, and a valve seat 20 that is formed at the end of a piston 22 and that is thus also mounted to move.

The valve is provided with an opening control chamber 24 for the valve stem. When said opening control chamber is fed with fluid, it urges the valve stem to move in the direction F, i.e. towards its open position in which it is spaced apart from the seat 20. A return spring 26 is disposed in the valve body so as to have an effect opposing the effect of fluid being fed into the chamber 24, and tending to move the valve stem in the direction opposite to the direction F, so as to return said valve stem towards its closed position, against the seat.

As indicated above, the valve seat is formed on the piston 22, at one end thereof. More precisely, the valve stem is engaged in a bore 22A with which the piston is provided, and said stem has a wider head 18A that bears against the edge of the bore 22A that forms the seat 20 so as to close the valve again when the valve stem is moved in the direction opposite to the direction F relative to the piston, or when the piston is moved in the direction F relative to the valve stem.

The piston 22 is caused to move by hydraulic control means. In the example shown, such control means comprise a closure control chamber 28 for the piston, which chamber is, in this example, formed directly at that end 10B of the body 10 that is situated in communication with the inlet port 12. That end 10B is open and it can be seen that the piston passes therethrough.

Said hydraulic control means further comprise a damping chamber 30, the shape of which is described in detail below.

The opening control chamber 24 for the valve stem is provided in the piston and it communicates with a space 28 which itself communicates with the inlet port 12. In this example, the space 28 is the closure control chamber 28 for the piston. More precisely, the piston has a tail 22B situated at that one of its ends that is remote from the seat 20. The bore 22A passes through the piston from one end to the other, and the chamber 24 is provided in a segment of said bore that extends between a closure stopper 32 and the rear end 18B of the valve stem 18, which end is opposite from its wider head 18A.

The opening control chamber 24 for the valve stem is fed with fluid as follows. The piston is provided with at least one window 34 (two windows in this example) that is disposed between the bore 22A and a peripheral portion 22C of said piston that is situated in the control chamber 28. In this example, said peripheral portion 22C is provided on the outside periphery of the piston, between its tail 22B and its contact portion 22D that co-operates with the inside periphery of the valve body 10.

The valve stem 18 is provided with an axial bearing surface 18C that co-operates with a guide portion of the bore 22A that is situated between the control chamber 24 and the window 34.

Figure 4:
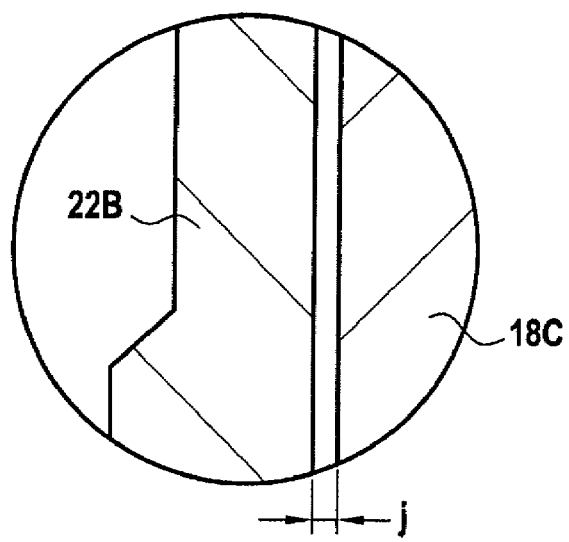
FIG. 4 is an enlargement of zone IV of FIG. 2.

As can be seen in the detail of FIG. 4, clearance j is provided between said axial bearing surface and said guide portion, thereby making communication possible between the chamber 24 and the chamber 28.

The clearance j can be provided merely by slightly underdimensioning the diameter of the axial bearing surface 18C relative to the diameter of the guide portion of the bore 22A. The communication between the control chamber 28 for the piston and the opening control chamber 24 for the valve stem can be established by any other suitable means (axial fluting or serrations on the axial bearing surface 18C so as to put the window 34 and the chamber 24 into communication with each other, or omission of the stopper 32 so as to make it easy for said chamber 24 to be fed and to be emptied). However, the embodiment shown offers the advantage of avoiding vibration.

It can be noted that, between the axial bearing surface 18C and the head 18A, the valve stem has a neck portion 18D that is slightly narrower for facilitating non-constricted flow of fluid between the inlet port 12 and the outlet port 14 of the valve when the head 18A is spaced apart from the seat. When they are provided, the above-mentioned fluting or serrations extend over the entire axial bearing surface, between said neck 18D and the rear end 18B of the stem 18.

The respective dimensions of the valve stem 18 and of the piston 22 (in particular as regards their respective surface areas that are exposed to the fluid contained in the chambers 24 and 28 and the above-mentioned clearance j), and the setting of the spring 26 are determined such that, when the pressure increases at the inlet port 12, and thus in the chambers 28 and 24, the valve stem reacts very rapidly to said pressure increase by moving in the direction F, before the piston 122 moves in the same direction.

The presence of the damping chamber 30 facilitates sequencing of the relative movements of the valve stem 18 and of the piston 22. In order to enable the piston to move in the direction F, it is necessary for fluid to flow out of the chamber 30, this outflow being effected via a constriction 36 that acts as a flow-rate limiter device.

Figure 3:
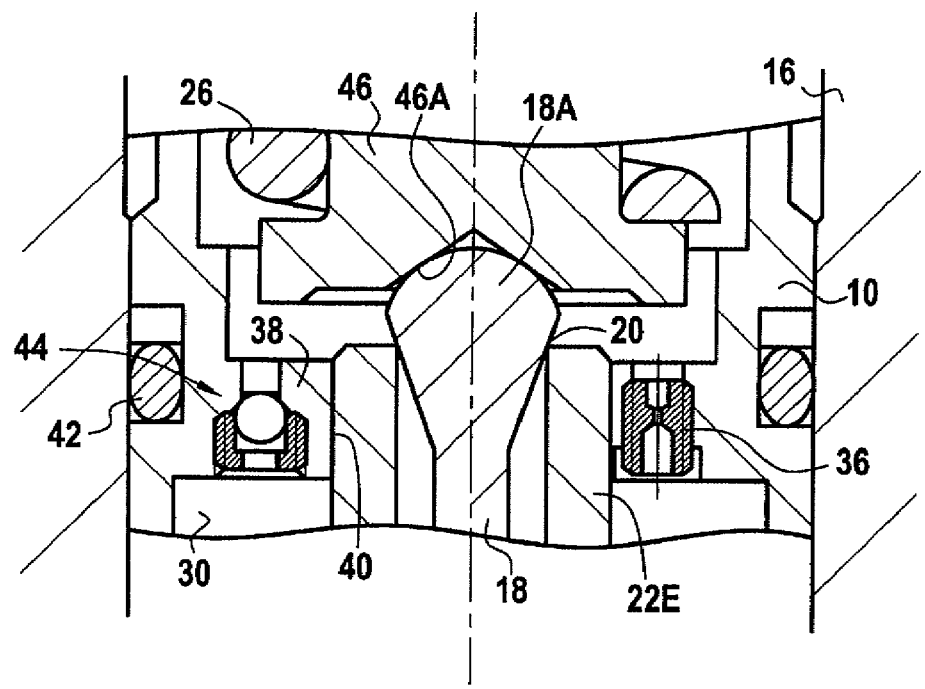
FIG. 3 is an enlargement of zone III of FIG. 2.

More precisely, as can be seen more clearly in FIG. 3, the valve body 10 has an internal annular wall 38 having a hole 40 in which an axial extension 22E of the piston is engaged, which axial extension carries the valve seat 20 at its free end. The contact portion 22D of the piston co-operates with the inside periphery of the valve body 10 on that side of said internal annular wall 38 that is remote from the outlet port 14. The damping chamber 30 is provided between said internal annular wall and said portion 22D of the piston. The constriction 36 is disposed between the damping chamber 30 and the outlet port 14 and, more precisely, in the internal annular wall 38, which wall is provided with a suitable additional hole for this purpose.

As can be seen in FIG. 2, the portion 22D of the piston is equipped with a sealing gasket 42 that guarantees leaktight contact between the outside periphery of the piston and the inside periphery of the valve body 10.

The damping chamber 30 is thus situated in front of the portion 22D of the piston in the direction of movement F of said piston. It should be noted that the above-mentioned axial extension 22E contributes to guiding the movement of the piston by co-operating with the wall of the hole 40 in which it extends.

Looking at the piston from its seat 20 to its opposite end, it can be observed that it comprises, in succession, the axial extension 22E, the greater-diameter portion 22D forming a flange, and the tail portion 22B. The windows 34 extend between the portion 22D and said tail portion 22B.

The valve is provided with a check valve 44 that can be seen more clearly in FIG. 3 that allows fluid to flow in substantially non-constricted manner from the outlet port 14 to the damping chamber 30, in the direction in which fluid is fed to said damping chamber. In this example, the check valve is disposed in the internal annular wall 38, which wall is provided with a suitable additional hole for this purpose. Thus, flow of fluid in the direction in which it flows out of the chamber 30 is limited by the constriction 36, while fluid is fed into the chamber substantially freely.

The valve operates as described below.

When the pressure increases in the chamber 28 and in the chamber 24, to the extent that the pressure in the chamber 24 reaches the setting of the spring 26, the valve stem 18 is moved in the direction F for opening the valve. However, since fluid flows out of the damping chamber 30 in constricted manner, the piston 22 can then also move in the direction F for catching up the head 18A of the valve stem 18 and for closing the valve again. If the pressure continues to increase in the chambers 28 and 24, the valve stem moves again in the direction F for opening the valve, and said valve is then closed again by the piston moving due to fluid flowing out of the chamber 30. These successive movements can continue until the piston has reached its maximum position, in which it comes into abutment against the annular wall 38.

When the valve is thus fully open, it allows non-constricted communication between the inlet port 12 and the outlet port 14 for the purpose in particular, when it is pressure limiter, of limiting the pressure of the fluid at the inlet by removing the surplus volume of fluid at the inlet port 12 to the outlet port 14. If it is necessary to close the valve rapidly, in particular due to a decrease in pressure at the inlet port 12, that is made possible by means of the fact that the damping chamber 30 is fed in non-constricted manner, thereby urging the piston to move in the direction opposite to the direction F, the spring 26 pushing the valve stem away in the same direction, while, since the pressure has decreased at the inlet port 12 relative to the setting of the valve, the control chambers 24 and 28 do not prevent that movement from taking place.

It can be seen in FIG. 2 that the spring 26 carries a return block 46 that is in abutment against the head of the valve stem. In this example, said head is convex, while the return block 46 is provided with a blocking recess 56A for said head, thereby enabling the spring and the valve stem to be mutually centered while said valve stem is moving. The setting of the spring can be modified by an adjustment screw 48 that is mounted to move in a stopper 50 of the valve body, and that co-operates with that end of the spring that is remote from the block 46.

Figure 5:
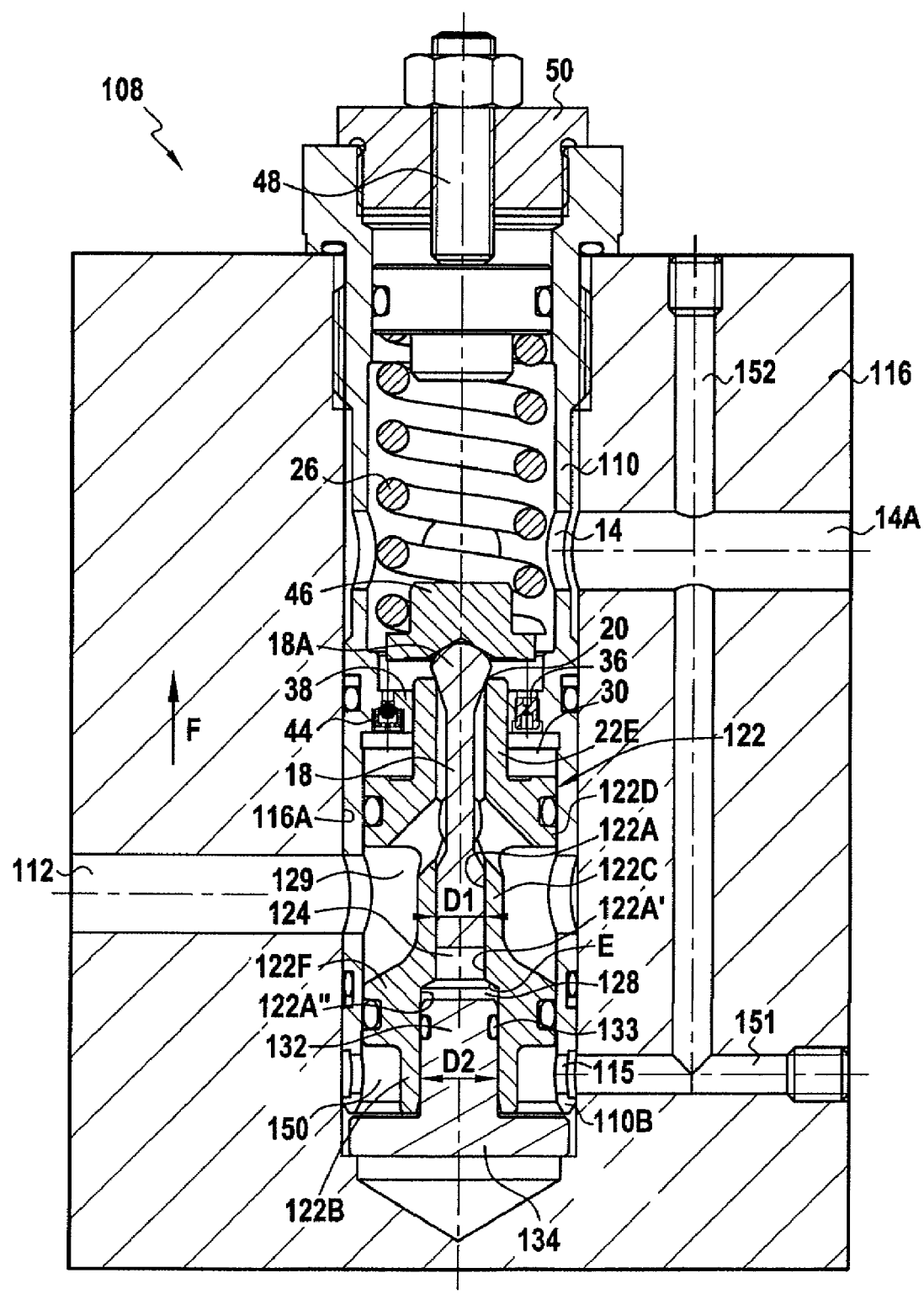
FIG. 5 is a view analogous to the FIG. 2 view, for a variant of the invention.

A description follows of FIG. 5 in which the elements that are unchanged relative to FIGS. 2 to 4 are designated by like reference numerals.

The modifications made relative to the valve shown in the preceding figures relate in particular to the closure control chamber for the piston. Said piston 122 is thus slightly modified, as is the valve body 110.

It can be seen that the bore 122A of the piston 122 is stepped and has a portion 122A' that is of smaller diameter D1 and a portion 122" that is of larger diameter D2. The opening control chamber 124 for the valve stem is formed in the smaller-diameter portion 122A' in which the valve stem is slidably mounted. The closure control chamber 128 for the piston is formed in the larger-diameter portion.

More precisely, it can be seen that the portions 122A' and 122A" are separated by a shoulder E in the bore 122A. When fluid is present in the space formed by the chambers 124 and 128, the fluid pressure acts on the cross-section of the end 18C of the valve stem so as to urge said valve stem to move in its opening direction F, and the fluid pressure acts on the cross-section of the shoulder E, as measured perpendicularly to the direction of movement F, so as to urge the piston to move in its closure direction F and so as to cause the valve seat 20 formed at that end of the piston 122 that is remote from the chambers 124 and 128 to catch up the head 18A of the valve stem 18.

Advantageously, the two above-mentioned cross-sections are mutually equal or substantially mutually equal, thereby making it possible to obtain a return force for returning the piston towards its rest position that is optimum, even under particular conditions of use of the valve, e.g. when said valve is a pressure limiter of the feed circuit of a turret motor equipping a machine that is on a slope.

The bore 122A of the piston 122 is a through bore but a guide stud 132 relative to which the piston 122 is suitable for sliding is inserted into the bore 122A, at that end thereof that is remote from the valve stem 18. In other words, the stud 132 is inserted into that end of the bore that is situated in the tail 122B of the piston 122. It can be seen that a sealing gasket 133 is disposed between the guide stud 132 and the wall of the bore 122A. Thus, the free end of the stud 132 closes the closure control chamber 128 at the end thereof that is remote from the valve stem.

It can be seen that the stud 132 is carried by a carrier element 134 that is disposed at the bottom of the bore 116A of the part 116 in which the valve is disposed, it being recalled that that part is, for example a casing portion of a hydraulic motor. In this example, said element 134 is disk-shaped, so that the one-piece unit formed by the stud 132 and by the element 134 is T-shaped in cross-section.

In this example, the element 134 is merely wedged between a shoulder at the bottom of the bore 116A and the free end 110B of the body 110, which body is screw-fastened into the bore 116A. Advantageously, a small amount of clearance is provided on mounting the element 134 into the bottom of the bore so as to enable the valve body 110 to be fastened in abutment against the part 116. In any event, as regards operation of the valve, the stud 132 is stationary relative to the valve body 110.

The inlet port 112 opens out into a space 129 provided inside the valve body windows 34 of the piston 122 that are analogous to the windows of the piston 22 are disposed between the bore 122A and the peripheral portion 122C of the piston situated in the space 129. As in the preceding figures, clearance provided between the axial bearing surface 18C of the guide stem and a guide portion of the bore (forming the wall of the opening control chamber 124 or situated in alignment therewith) makes it possible to feed the opening chamber 124. In this example, insofar as the closure control chamber 128 for the piston is situated in the same bore 122 as the chamber 124, this clearance also makes it possible to feed the closure control chamber. In this example, the space 129, which is annular, is provided between the inside wall of the body 110 and the portion 122C of the piston, which portion is an axial portion of smaller diameter.

It can be seen that another annular space 150 is provided around the piston 122 by being defined by said piston and by the carrier element 134. More precisely, the annular space 150 is defined around the tail 122B of the piston that is an axial portion of smaller diameter, and that is separated from the above-mentioned portion 122C by a wider portion 122F that, like the portion 122D (which is analogous to the portion 22D) of the piston of the preceding figures) co-operates in leaktight manner with the inside wall of the body 110. Thus, the spaces 129 and 150 are isolated from each other.

The space 150 is connected to the outlet port 14 of the valve. It can be seen that the part 116 in which the valve body is disposed is provided with holes 151 and 152 that connect the hole 14A to a port 115 of the valve body. Provision is thus made for the chamber formed by the annular space 150 to be at the same pressure as the chamber in which the spring 26 is disposed. By way of a variant, the space 150 can be connected to the outlet 14 by a duct provided in the wall of the body 110 when the thickness of said wall so permits.

In the variant shown in FIG. 5, the communication between the opening and closure chambers is more direct that in the preceding figures, since said chambers are actually two portions of the same bore.

The invention claimed is:

1. A valve having damped opening, said valve comprising a valve body having an inlet port and an outlet port, a valve stem suitable for moving between a closed position in which said stem co-operates with a valve seat so as to isolate the inlet port and the outlet port from each other, and an open position in which the stem is spaced apart from the seat so as to put the inlet and the outlet ports into communication with each other, the valve further comprising an opening control chamber for the valve stem, which chamber is suitable for being fed with fluid so as to urge the valve stem to move towards its open position, a return spring for urging the valve stem to move towards its closed position, a piston suitable for sliding in the body in a closure movement for urging contact to be established between the valve stem and the seat, the valve seat being formed on the piston and said piston being provided with a bore in which the valve stem is slidably disposed; the valve comprising, for causing the piston to move, a flow-rate limiter device for deferring the closure movement of the piston relative to the movement of the valve stem towards the open position thereof, and a damping chamber disposed in a manner such that fluid must flow out of said damping chamber in order to enable the piston to move in the closure movement thereof, the fluid flowing out via the flow-rate limiter device that is disposed between the damping chamber and the outlet port.

2. A valve according to claim 1, wherein the opening control chamber for the valve seat is provided in the piston, and the hydraulic control means for causing the piston to move include a closure control chamber for the piston, which chamber communicates with said opening control chamber for the valve stem via the inside of the valve.

3. A valve according to claim 1, wherein the piston has at least one window disposed between the bore and a peripheral portion of the piston that is situated in a space communicating with the inlet port, and wherein the valve stem has an axial bearing surface that is suitable for co-operating with a guide portion of the bore that is situated between the opening control chamber for the valve stem and said window, clearance provided between said axial bearing surface and said guide portion making it possible for communication to be established between said space and the opening control chamber for the valve stem.

4. A valve according to claim 2, wherein the piston has at least one window disposed between the bore and a peripheral portion of the piston that is situated in a space communicating with the inlet port, and wherein the valve stem has an axial bearing surface that is suitable for co-operating with a guide portion of the bore that is situated between the opening control chamber for the valve stem and said window, clearance provided between said axial bearing surface and said guide portion making it possible for communication to be established between said space and the opening control chamber for the valve stem.

5. A valve according to claim 4, wherein said space comprises the closure control chamber for the piston.

6. A valve according to claim 2, wherein the bore of the piston is stepped and has a smaller-diameter portion, in which the valve stem is slidably received and in which the opening control chamber for said stem is formed, and a larger-diameter portion remote from the valve stem and in which said closure control chamber for the piston is formed.

7. A valve according to claim 6, wherein a guide stud relative to which the piston is suitable for sliding, is inserted into the bore of the piston, at that end of said piston that is remote from the valve stem.

8. A valve according to claim 4, wherein the bore of the piston is stepped and has a smaller-diameter portion, in which the valve stem is slidably received and in which the opening control chamber for said stem is formed, and a larger-diameter portion remote from the valve stem and in which said closure control chamber for the piston is formed.

9. A valve according to claim 8, wherein a sealing gasket is disposed between the guide stud and the wall of the bore.

10. A valve according to claim 7, wherein an annular space is provided around the piston by being defined by the piston and by a carrier element carrying the guide stud, said annular space being connected to the outlet port.

11. A valve according to claim 9, wherein an annular space is provided around the piston by being defined by the piston and by a carrier element carrying the guide stud, said annular space being connected to the outlet port.

12. A valve according to claim 1, wherein the opening control chamber for the valve stem communicates with the inlet port.

13. A valve according to claim 1, wherein the valve body is provided with an internal annular wall having a hole, wherein the piston is provided with an axial extension that carries the valve seat and that is engaged in said hole, and a contact portion that co-operates with the inside periphery of the valve body on that side of the internal annular wall that is remote from the outlet port, and wherein the damping chamber is provided between said internal annular wall and said contact portion of the piston.

14. A valve according to claim 13, wherein the flow-rate limiter device is disposed in the internal annular wall.

15. A valve according to claim 13, provided with a check valve allowing fluid to flow in substantially non-constricted manner from the outlet port to the damping chamber in the direction in which said chamber is fed with fluid.

16. A valve according to claim 15, wherein the check valve is disposed in the internal annular wall.

17. A valve according to claim 1, wherein the spring carries a return block that is in abutment against the head of the valve stem.

18. A valve according to claim 17, wherein the head of the valve stem is convex, while the return block is provided with a blocking recess for said head.

* * * * *